United States Patent [19]
Hyslop

[11] Patent Number: 5,876,166
[45] Date of Patent: Mar. 2, 1999

[54] TRAILER-MOUNTED LATCHING MECHANISM FOR A BOAT

[76] Inventor: William J. Hyslop, 105 Jefferson Valley, Coatesville, Ind. 46121

[21] Appl. No.: 898,068

[22] Filed: Jul. 22, 1997

[51] Int. Cl.$^6$ ..................................................... B60P 7/08
[52] U.S. Cl. ................................. 410/77; 410/2; 410/69; 410/86; 280/414.1
[58] Field of Search ................................ 410/2, 3, 7, 69, 410/77, 80, 86; 280/414.1, 508; 292/334, 341.17; 414/536; 114/344

[56] References Cited

U.S. PATENT DOCUMENTS

| | | | |
|---|---|---|---|
| 3,325,186 | 6/1967 | Lund | 280/508 X |
| 3,938,829 | 2/1976 | Anderson . | |
| 3,963,263 | 6/1976 | Whitlock | 280/414.1 |
| 3,989,267 | 11/1976 | Robinson . | |
| 4,114,920 | 9/1978 | Boettcher . | |
| 4,919,446 | 4/1990 | Higgins . | |
| 5,120,079 | 6/1992 | Boggs | 280/508 X |
| 5,567,095 | 10/1996 | James et al. | 410/7 |
| 5,599,035 | 2/1997 | Spence | 410/77 X |
| 5,683,214 | 11/1997 | Jeffreys | 410/77 |

Primary Examiner—Stephen T. Gordon
Attorney, Agent, or Firm—Woodard, Emhardt, Naughton Moriarty & McNett

[57] ABSTRACT

A latching mechanism for attachment to a boat trailer and for securely latching onto the U-bolt typically found on a boat bow includes an integral weldment providing a pair of oppositely-disposed side plates and a cooperating support plate positioned therebetween. Assembled to the side plates are a pair of alignment cones which help to guide and direct the bow of the boat and in particular the U-bolt into the latching mechanism. The support plate defines a receiving channel having a closed base and an open entrance. A pair of spring-biased latching jaws are pivotally attached to the support plate on opposite sides of the receiving channel and are normally positioned in a closed and latching condition. Each latching jaw includes a tip portion and the two tip portions are oriented so as to extend inwardly toward each other and across the open end of the receiving channel. As the U-bolt moves into the open end of the channel and pushes against the tip portions, the latching jaws spring open, allowing the U-bolt to position itself within the receiving channel. At this point the latching jaws close back and prevent the U-bolt from exiting the receiving channel. In order to free the U-bolt from the latching mechanism, a release member is provided which is manually pushed in between the two latching jaws to separate those jaws and allow removal of the U-bolt.

13 Claims, 11 Drawing Sheets

TRAILER-MOUNTED LATCHING MECHANISM FOR A BOAT

BACKGROUND OF THE INVENTION

The present invention relates in general to latching mechanisms which are designed to securely connect or attach one object to another object, such as a boat to a boat trailer. More specifically the present invention relates to an automatic latching mechanism which is attached to a boat trailer and which securely receives the U-bolt which is fixed to the bow of a boat.

Boat trailers for transporting, launching, and retrieving fishing boats and pleasure boats are widely used by the boating public. While a variety of different winch and tow rope arrangements have been and may be employed, one commonly used element of such arrangements is an U-bolt or eyelet of some configuration which is fixed to the bow of the boat, typically on the centerline of the boat. Since the bow U-bolt is typically located in a similar position, independent of the particular boat style, it provides one aspect of some consistency between varying designs, styles, sizes, and makes of boats.

A review of earlier patents indicates that one disadvantage, as viewed by other designers, with a winch and tow rope arrangement is that at least two people are required to effectively retrieve and load the boat onto the trailer. One person is normally needed to connect the tow line to the boat and operate the winch. The other person is required to navigate and maintain the boat in alignment with the boat trailer. Since there are situations where two people are not always available to load a boat onto a boat trailer, it has been suggested that it would be an improvement to existing trailer designs with a winch and tow rope arrangement if an automatic latching mechanism could be provided which securely attaches to the U-bolt of the boat bow. While an automatic latching mechanism on the boat trailer would conceivably only require one individual to load the boat onto the boat trailer, as a practical matter you would prefer to have one individual handling the boat and a second individual handling the boat trailer and the vehicle towing the boat trailer. This is the most efficient approach. However, even with two individuals and even if a winch and tow rope arrangement is available, there is still a certain awkwardness to the currently practiced method. While one individual will stay with the trailer and tow vehicle, the individual directing the boat onto the trailer may be required to lean forward over the bow and hook the winch rope into the U-bolt. It would thus be an improvement to this procedure if an automatic latching mechanism could be provided.

Over the years certain designers have tried to provide improvements to the winch and tow rope arrangements, even suggesting elimination of those arrangements. One such earlier design effort involves the use of a latching mechanism with a locking pin. This type of design is represented by U.S. Pat. No. 3,989,267 which issued Nov. 2, 1976 to Robinson. In order to perform its intended function, the pin 27 of U.S. Pat. No. 3,989,267 must be initially pulled out, set in a cocked position, and biased by spring 33 against the edge of trigger plate 30. The associated spring compression and preload is a disadvantage in that this arrangement results in greater wear and a greater risk that the cocked arrangement will be jarred loose and released prior to connecting to the U-bolt. If the cocked arrangement is jarred loose and released, it would not be properly conditioned to receive and thereafter securely hold the U-bolt. Another concern with this design is the constant load on pin 27 when it is inserted through the U-bolt due to the weight of the boat.

While the '267 patent represents one trailer latch mechanism which does not involve a winch and tow rope arrangement, other similar design arrangements are represented by the following patents:

| PATENT NO. | PATENTEE | ISSUE DATE |
| --- | --- | --- |
| 3,938,829 | Anderson | Feb. 17, 1976 |
| 4,114,920 | Boettcher | Sep. 19, 1978 |
| 4,919,446 | Higgins | Apr. 24, 1990 |

In evaluating the efficiency, reliability, cost and suitability of these other designs, it is important to keep in mind that reliability is of primary importance. The preferred latching mechanism is one which is normally unloaded and not in a highly spring-biased condition, one which operates in an automatic manner and is virtually fool-proof, one which is suitable for a wide range of boat shapes and sizes, and one which will securely anchor the boat to the trailer regardless of external conditions such as the angle of the trailer, size and weight of the boat, and the speed at which the boat ramps up onto the boat trailer. It is also preferred that the latching mechanism be designed such that it is extremely strong and any wear loading is minimal. The present invention provides each of these desirable features with a structure that is novel and unobvious.

SUMMARY OF THE INVENTION

A latching mechanism constructed and arranged to be attached to a boat trailer and to securely receive a boat bow connection member so as to keep the boat on the boat trailer according to one embodiment of the present inventions comprises a frame member including a pair of oppositely-disposed side plates and a support plate positioned between and attached to the side plates, the support plate defining a receiving channel which includes a closed base and an open end, a pair of latching jaws which are pivotally attached to the support plate, one latching jaw being positioned on one side of the receiving channel and the other latching jaw being positioned on an opposite side of the receiving channel, each of the latching jaws including a tip portion which extends inwardly toward the receiving channel, a pair of spring-biasing arrangements attached to the support plate and cooperatively positioned relative to the latching jaws so as to normally position the latching jaws in a closed and latched condition wherein the tip portions of the latching jaws are adjacent to each other so as to reduce the width of the open end of the channel, the adjacent tip portions having an entrance side and opposite thereto an exit side and a release mechanism attached to the support plate and being moveable to pivotally separate the latching jaws so as to place the latching jaws in an open condition, wherein the latching jaws are pivotally moveable to the open condition by pushing the connection member against the entrance side of the tip portions, the tip portions returning to their closed condition once the connection member is positioned adjacent the base of the receiving channel.

One object of the present invention is to provide an improved latching mechanism for securing a boat bow to a boat trailer.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
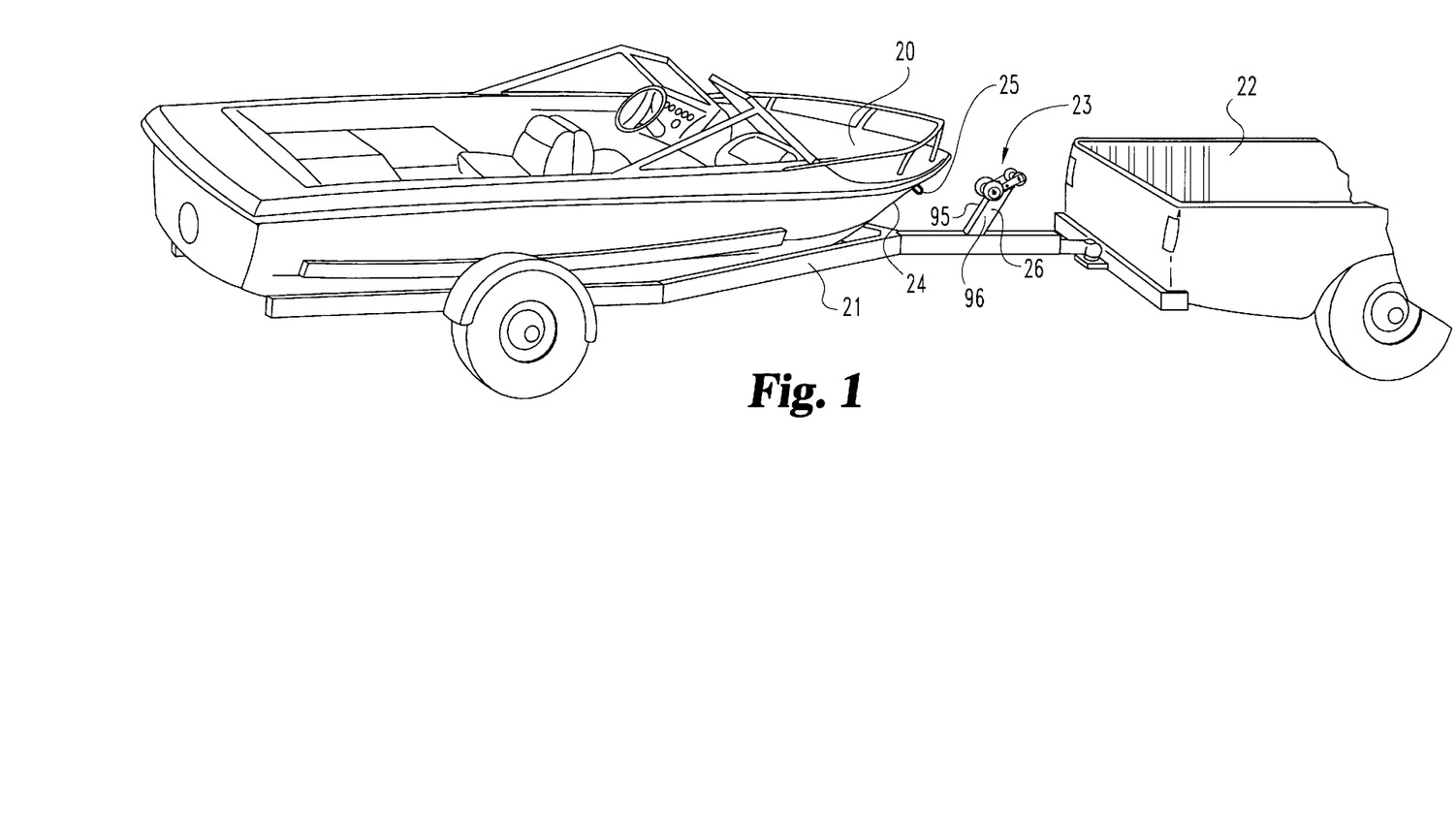
FIG. 1 is a side elevational view of a boat loaded onto a boat trailer which includes a latching mechanism according to one embodiment of the present invention.

Referring to FIG. 1 there is illustrated a boat 20 being loaded onto a boat trailer 21 which is in tow behind vehicle 22. Attached to the trailer 21 is a latching mechanism 23 which is designed and attached to the trailer according to a typical embodiment of the present invention. The bow 24 of the boat 20 includes a U-bolt 25 which may alternatively take the form of an eyebolt. In order to attach the bolt to the trailer as the boat is coming out of the water and being loaded onto the trailer, the latching mechanism 23 is designed to automatically and securely receive the U-bolt 25. The clevis-type bracket arrangement 26 on the trailer is used to attach the latching mechanism by means of conventional mounting hardware. As the boat 20 moves up onto the trailer 21, the bow 24 is guided into and along the longitudinal centerline of latching mechanism 23. Eventually the U-bolt 25 slides into and pushes open the spring-biased closing jaws of the latching mechanism 23 which then automatically latch closed through the interior opening of the U-bolt.

Figure 2:
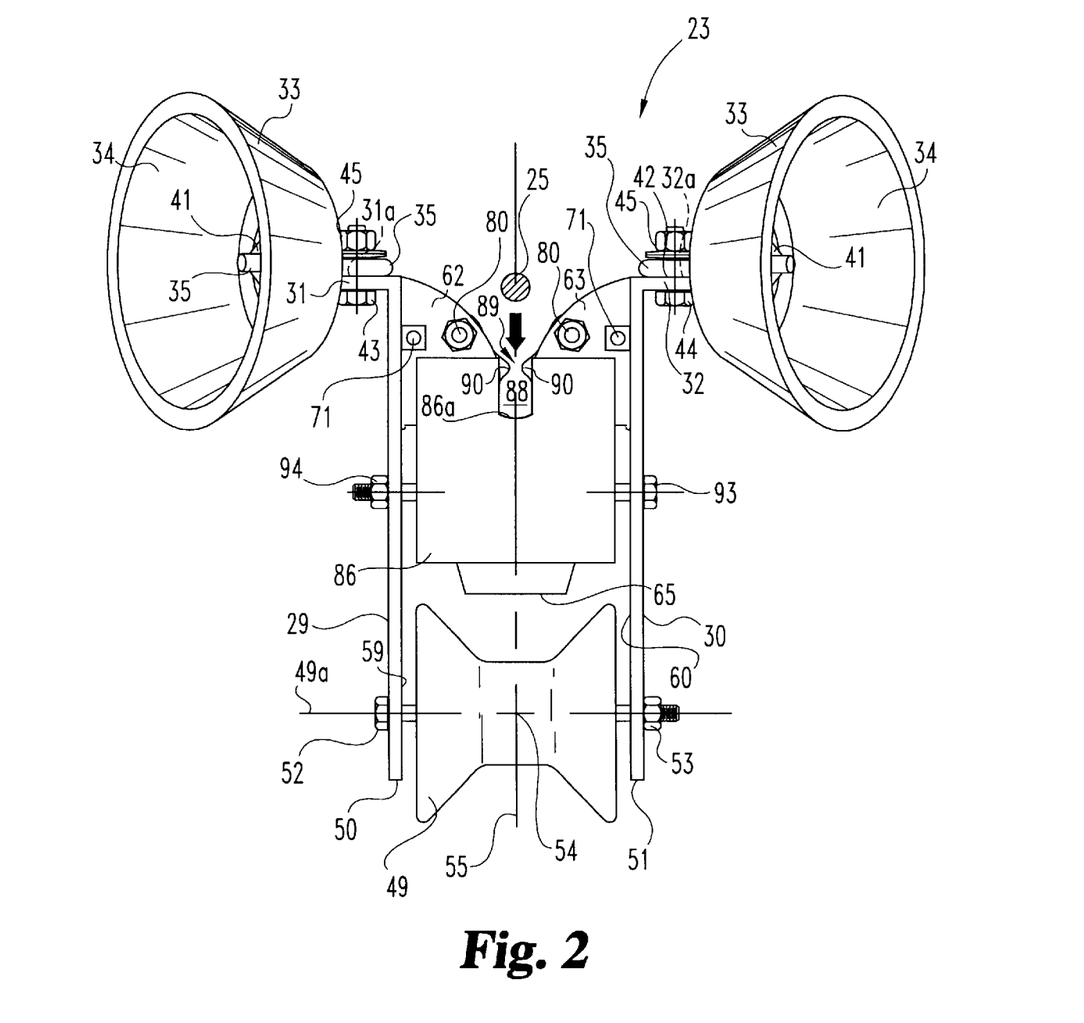
FIG. 2 is a top plan view of the FIG. 1 latching mechanism in an unlatched condition.
Figure 3:
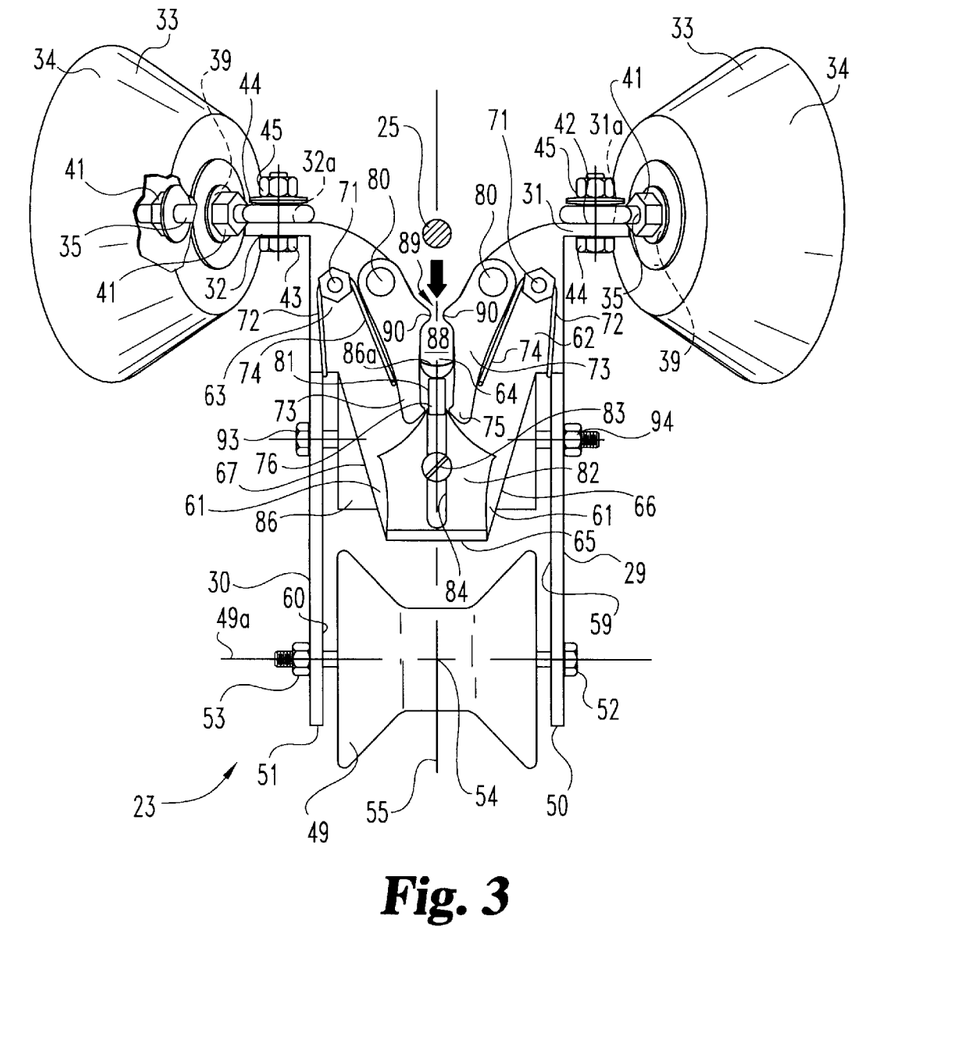
FIG. 3 is a bottom plan view of the FIG. 1 latching mechanism in an unlatched condition.
Figure 4:
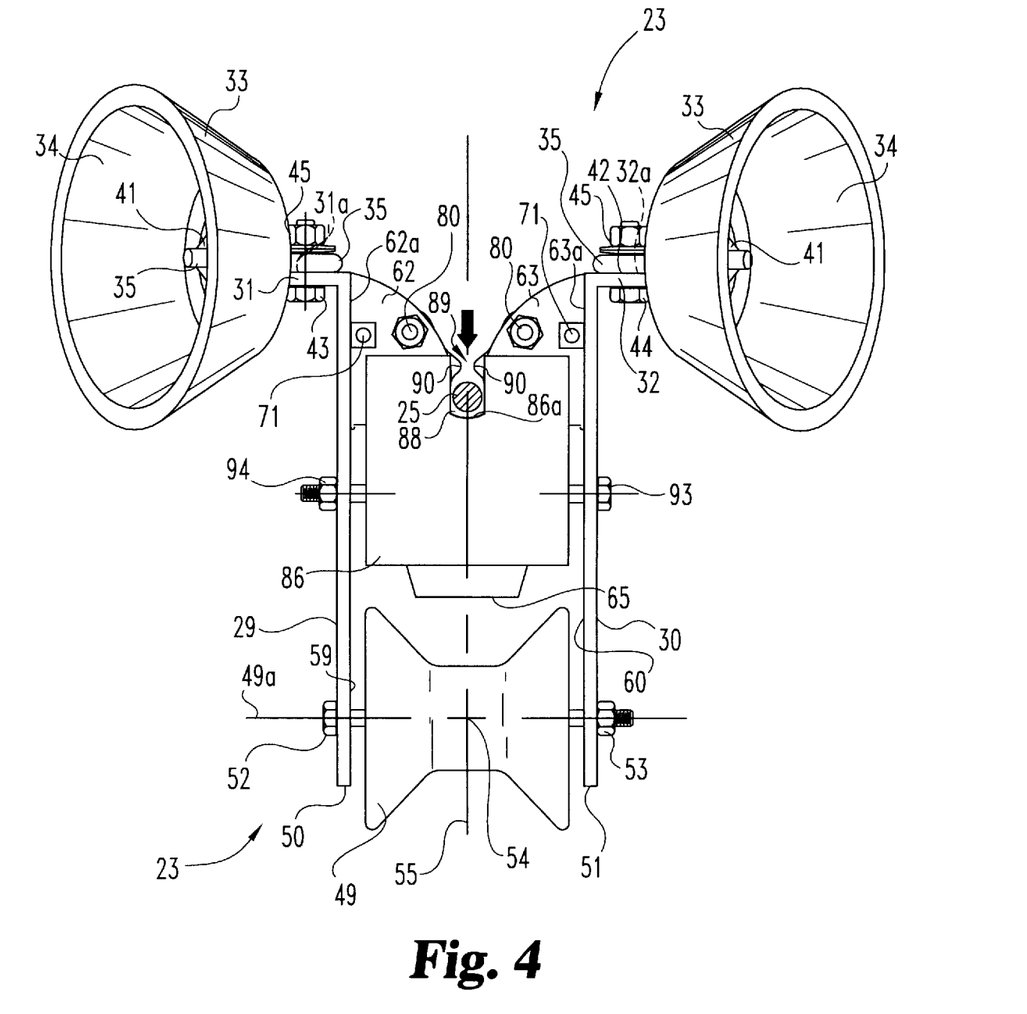
FIG. 4 is a top plan view of the FIG. 1 latching mechanism in a closed condition.
Figure 5:
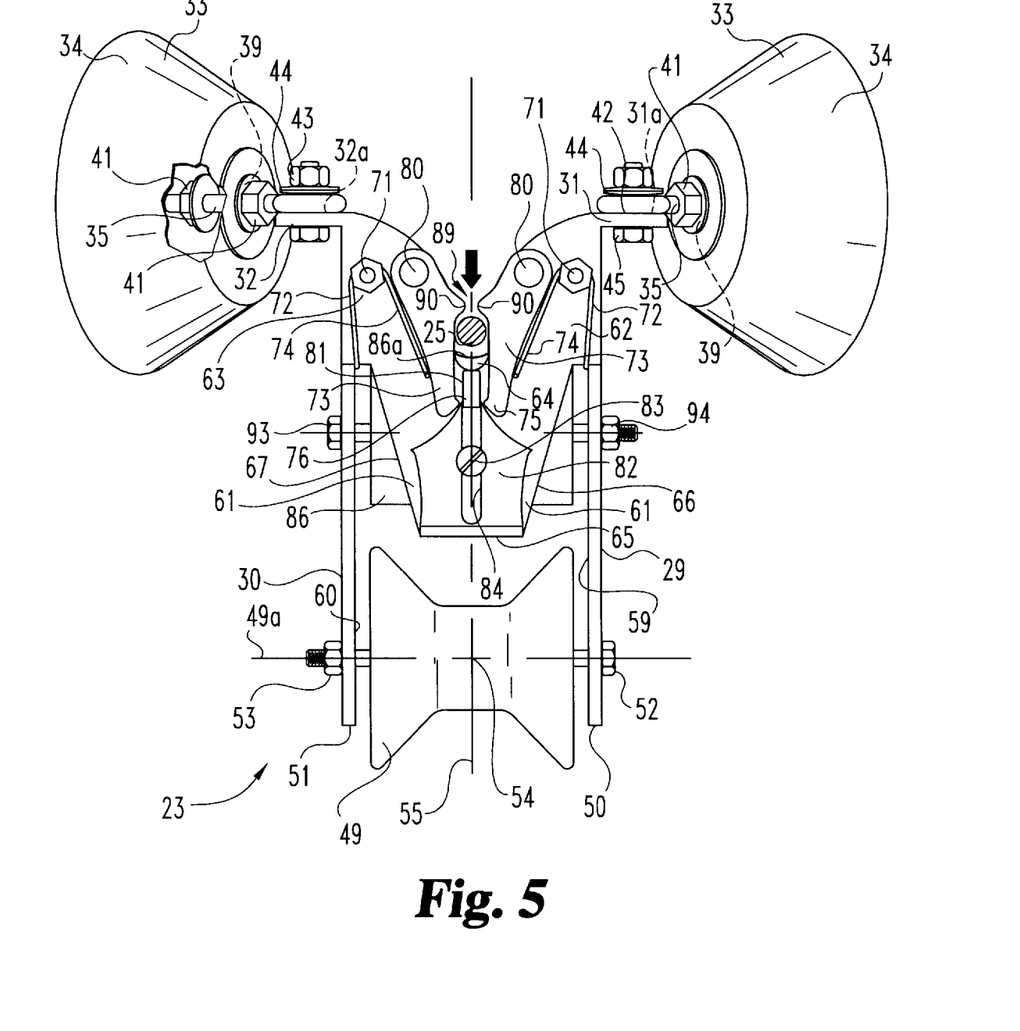
FIG. 5 is a bottom plan view of the FIG. 1 latching mechanism in a closed condition.
Figure 6:
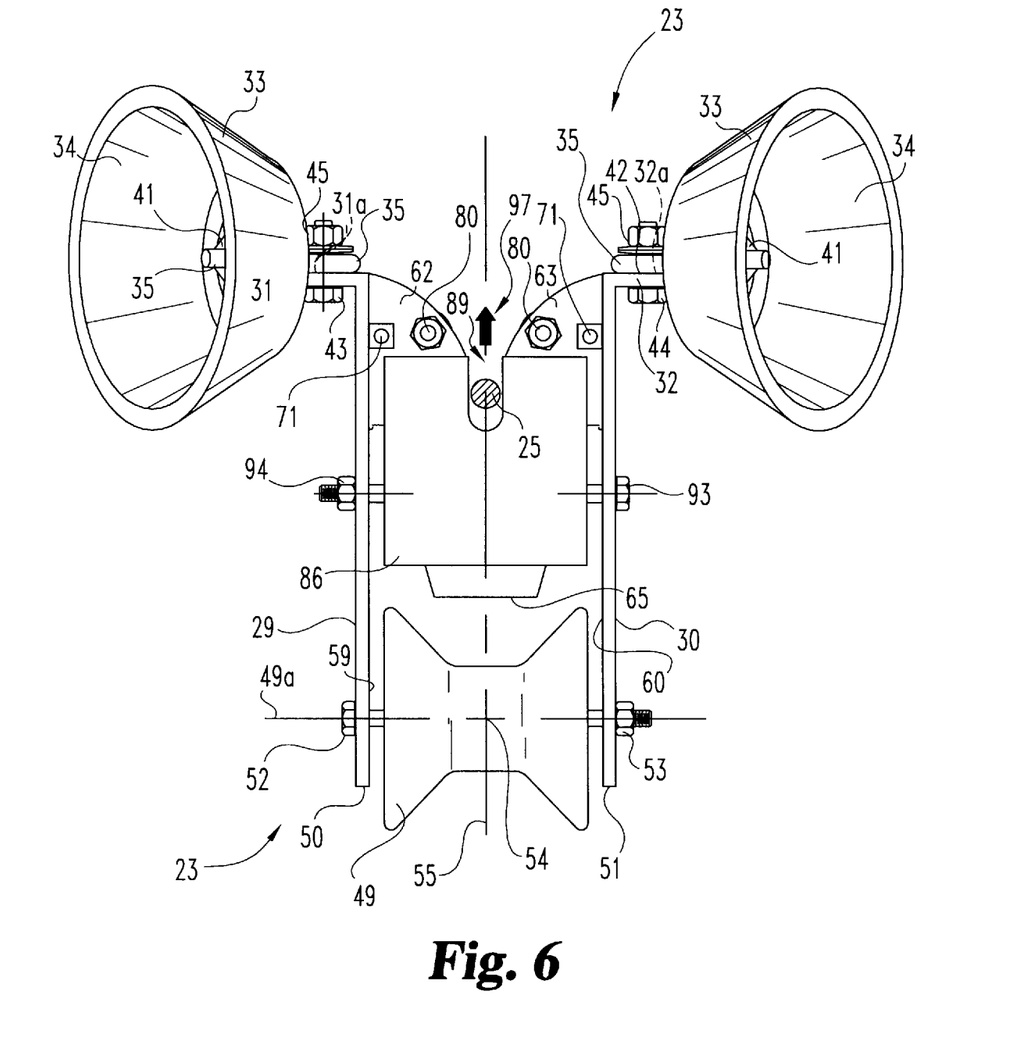
FIG. 6 is a top plan view of the FIG. 1 latching mechanism in a manually opened condition.
Figure 7:
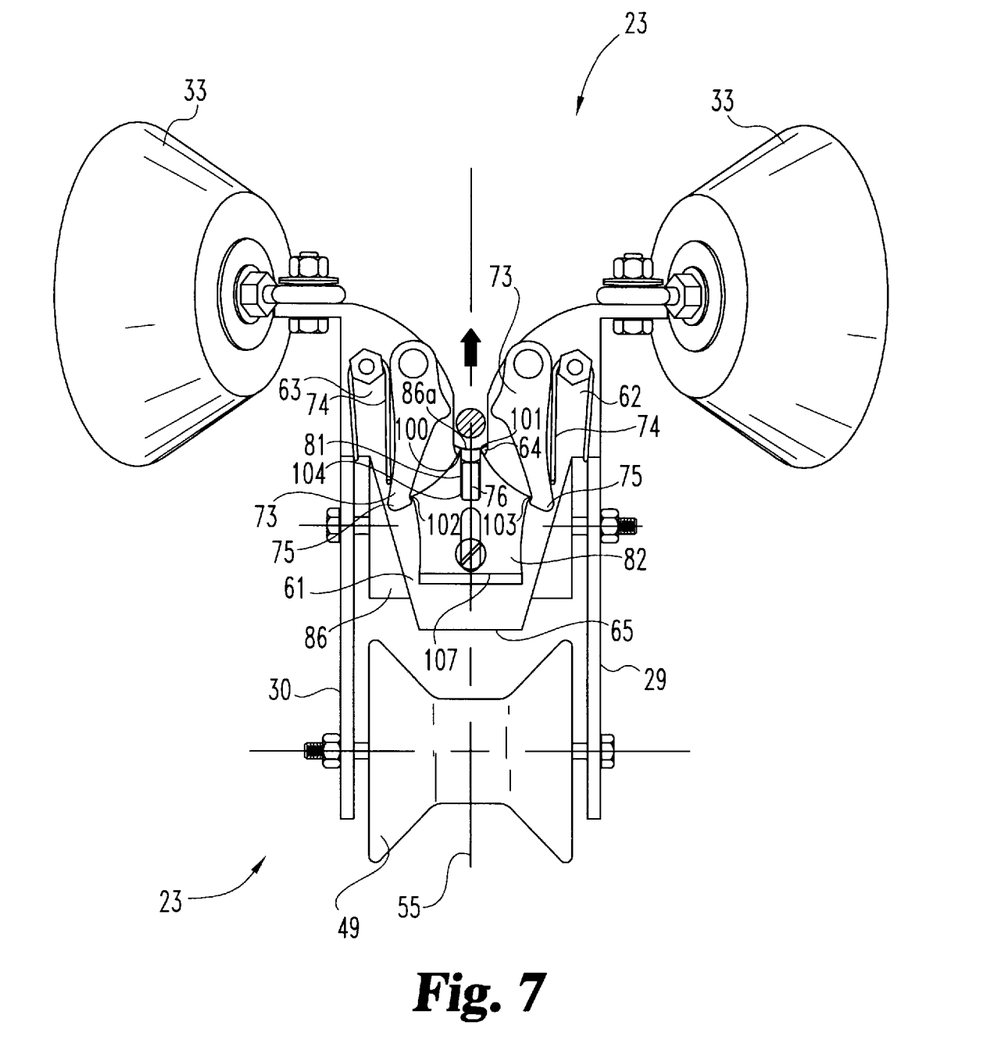
FIG. 7 is a bottom plan view of the FIG. 1 latching mechanism in a manually opened condition.
Figures 8, 9:
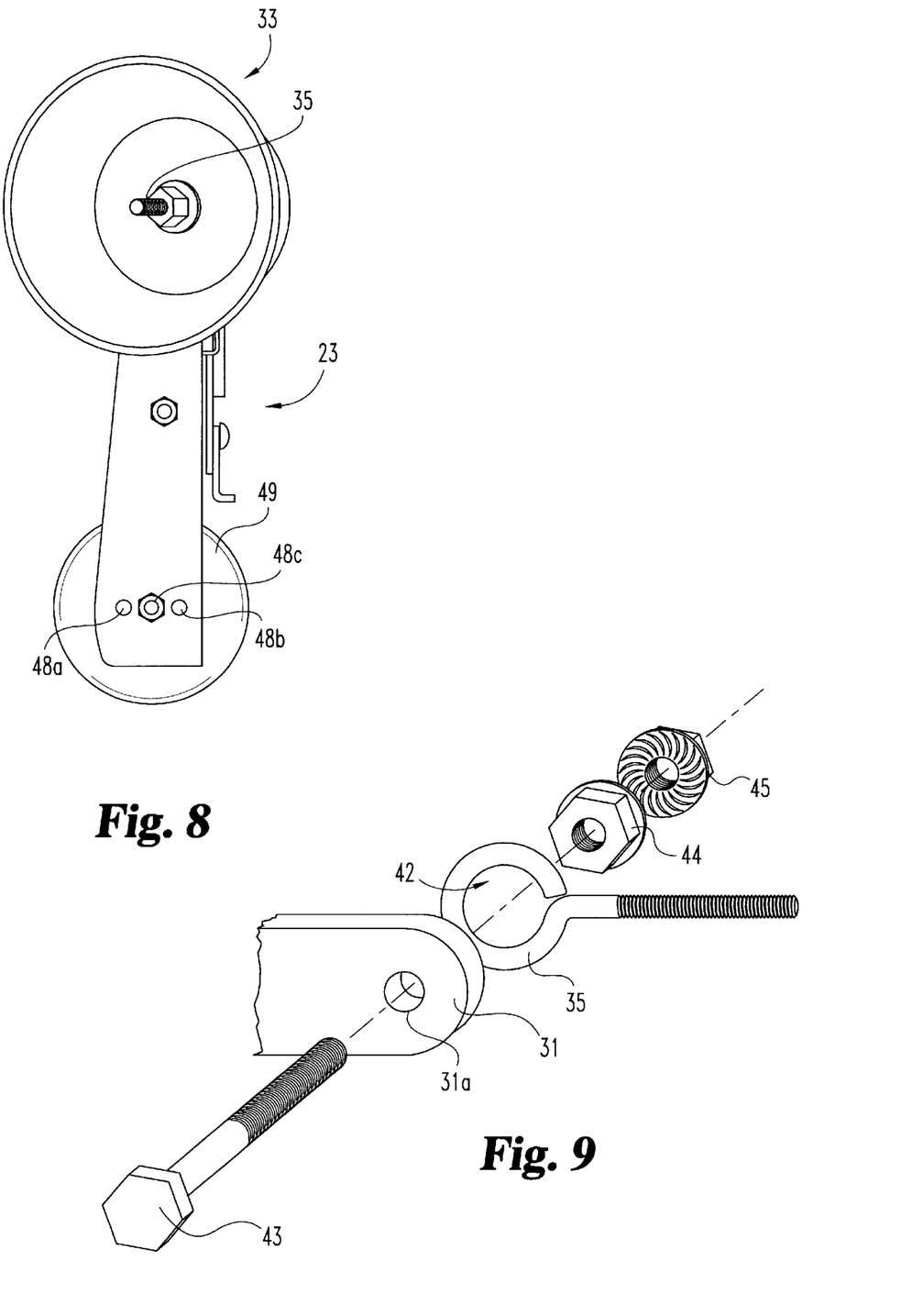
FIG. 8 is a side elevational view of the FIG. 1 latching mechanism.
FIG. 9 is a perspective, exploded view of a support arm and cooperating hardware comprising a portion of the latching mechanism of the present invention.

With reference to FIGS. 2 through 8, the latching mechanism 23 is illustrated in greater detail. FIGS. 2 and 3 illustrate the latching mechanism in a cocked and ready condition (i.e., unlatched) prior to receipt of the U-bolt 25. FIGS. 4 and 5 illustrate the latching mechanism 23 after it has opened and then closed around and through U-bolt 25 so as to securely hold the U-bolt and anchor the bow 24 of the boat 20 to the trailer 21. FIGS. 6 and 7 illustrate how the latching mechanism is manually opened to release the U-bolt 25 from the receiving channel. FIG. 8 is a side elevational view which is basically the same regardless of the condition (unlatched or closed) of latching mechanism 23. The latching mechanism 23 includes a unitary metal frame which includes two spaced-apart and oppositely-disposed side plates 29 and 30 which are each substantially flat and substantially parallel to each other. Each plate 29 and 30 includes a right angled end portion 31 and 32, respectively. Each end portion 31 and 32 defines a clearance aperture 31a and 32a, respectively. End portions 31 and 32 are preferably welded to the corresponding side plates. Pivotally attached via the respective apertures 31a and 32a to each one of the end portions is an alignment cone subassembly 33. Each alignment cone subassembly 33 includes a rubber cone 34, support arm 35, and conventional mounting hardware. Each cone has a central bore 39 which is located concentric with the annular centerline axis of each cone 34. Extending through bore 39 of each cone 34 is the externally threaded end of the support arm 35. Two hex nuts 41 threaded onto end, one on each side of the cone, accompanied by various flat washers, secure the cone to the threaded end.

The hollow eye portion 42 of each support arm 35 is positioned in alignment with the corresponding clearance aperture, either 31a or 32a, and by means of hex head bolt 43 and a pair of abutting flanged hex nuts 44 and 45, each support arm is secured to its corresponding end portion. In the preferred embodiment, the flanged hex nuts 44 and 45 include a serrated or ribbed washer base which is integral with the hex nut portion (see FIG. 9). The hex nut portion of nut 44 is inserted into eye portion 42 and the ribbed washer base rests against the support arm 35 with the ribbed or serrated surface of the washer base facing away from the support arm. The ribbed surface of the washer base of nut 45 faces nut 44 such that the two ribbed surfaces of the corresponding washer bases abut against each other into a securely locked mechanical assembly. By loosening flanged hex nuts 44 and 45, the angle of tilt of the support arms 35 relative to the side plates 29 and 30 can be changed to accommodate the specific bow geometry of the boat 20 being loaded onto trailer 21. Once the proper included angle between the two rubber cones 34 is set by tilting each support arm 35, the mounting hardware is tightened.

A centered guide roller 49 is rotatably attached between and to the free ends 50 and 51 of side plates 29 and 30, respectively. The free ends 50 and 51 are each arranged with a series of clearance holes 48a–48c (see FIG. 8) so that the guide roller 49 can be attached at different locations. The clearance holes 48a–48c in one free end are aligned with those in the other free end so that the centerline axis of rotation 49a is substantially perpendicular to longitudinal centerline 55. Bolt 52 and nut 53 provide the necessary mounting hardware. Flat washers are positioned on each side of guide roller 49 between the guide roller and the corresponding side plates. Roller 49 has a spool-like shape with a reduced diameter center portion 54 which is centered on longitudinal centerline 55. As the bow of the boat moves into the latching mechanism in the direction of free ends 50 and 51, the bow becomes wider and contact with the rubber cones 34 occurs. As this contact occurs, the leading edge of the bow contacts the guide roller 49. The latching mechanism may also tilt or pivot due to the weight of the boat and move support plate 61 so that it becomes substantially parallel with the boat bow.

Integrally formed as part of the unitary metal frame and joined at the inside facing surfaces 59 and 60 of side plates 29 and 30, respectively, is a unitary support plate 61. Plate 61 is shaped with oppositely-disposed side arms 62 and 63. Support plate 61 defines a central clearance slot 64 which is symmetric about centerline 55. Likewise, plate 61 is symmetric about centerline 55. Plate 61 has a straight end edge 65 and from that edge to the side plates 29 and 30, plate 61 includes diverging sides 66 and 67. In lieu of plate 61 being in unitary construction with side plate 29 and 30 to form the frame, a weldment is contemplated.

Bolted to each side arm 62 and 63, respectively, is a spring post 71. A coiled biasing spring wire 72 is anchored to each spring post 71. Pivotally attached to each side arm 62 and 63 is a latching jaw 73. The extending portion 74 of each wire 72 applies a moderate biasing spring force along the side of its corresponding latching jaw 73. This biasing spring force pushes the two ends 75 toward each other into virtual abutment against abutment block 76. Shoulder bolts 80 and conventional hex nuts and washers on the opposite side provide the pivoting connection and pivot point for jaws 73. The spring force which is exerted only needs to overcome the tendency of the jaws to move apart due to vibration.

Abutment block 76 is positioned in slot 81 and is securely welded to support plate 61 at the end of channel 88. Positioned adjacent to block 76 is sliding release member 82 which is controlled and guided by screw 83 which is threadedly received by support plate 61 and which extends up through slot 84 which functions as an elongated bolt hole. Member 82 and its slot 84 are symmetric about centerline 55. Shock absorber pad 86 is a hard rubber pad which is bolted in position and centered on centerline 55. A bore is drilled through shock absorber pad 86 for securing that pad in position between the two side plates 29 and 30.

A latch channel 88 is defined by support plate 61 and is centered on centerline 55. Channel 88 is generally coincident with channel 64. Extending across the entrance 89 of channel 88 are jaw tips 90, one each being provided by each latching jaw 73. The base of channel 88 which is closed by block 76 is adjacent a cooperating edge 86a of pad 86. The proximity of the two tips 90 to each other effectively reduces the width of channel 88 such that the U-bolt is unable to pass between the two tips 90. The spring wires 72 maintain this closed condition of jaws 73 until the U-bolt 25 of the boat bow 24 is pushed into the latching mechanism 23 with enough force or momentum to overcome the spring-biasing force of spring wires 72. The leading side or bar of U-bolt 25 is represented in FIGS. 2 through 5 in cross sectional form, first as it is entering in the direction of the arrow (FIGS. 2 and 3) and then as it is received and latched (FIGS. 4 and 5). The facing jaw tips 90 can be thought of as having an entrance side that the U-bolt pushes against when entering channel 88. Likewise, the jaw tips 90 have an exit side which the U-bolt pushes against when trying to exit.

Bolt 93 and hex nuts 94 are used to secure the shock absorber pad 86 in position. The width of pad 86 relative to the spacing between facing surfaces 59 and 60 is sufficient to allow the spaced-apart support flanges 95 and 96 of clevis-type bracket arrangement 26 to be positioned therebetween as is illustrated. This is the method of attaching the latching mechanism 23 to the boat trailer 21. Since there is only a single line of attachment, it is possible for the latching mechanism 23 to pivot, typically in a counterclockwise direction based on the FIG. 1 view, due to the weight distribution of the assembly.

In use, the latching mechanism 23 is prepared for receipt of U-bolt 25 by being positioned in the orientation of FIGS. 2 and 3. This is the cocked and ready position, or what might be referred to as the unlatched position, for latching mechanism 23. As the bow of the boat ramps up onto the boat trailer, the leading edge or leading post of the U-bolt, which is typically centered on the bow of the boat, may not be precisely on centerline 55 or at the right height. However, as the two alignment cones 34 are contacted by the bow of the boat, they function to direct and lift the bow of the boat and accordingly direct the U-bolt along centerline 55. As the front portion or post of the U-bolt begins to enter channel 88, the cone shaped roller 49 is contacted by the bow of the boat which pivots the latching mechanism in a clockwise direction (see FIG. 1). The bow of the boat is now in contact with rollers 34 and 49 and is substantially parallel to support plate 61 as the two tips 90 are contacted and a pushing force is applied on these tips by the U-bolt. The mass and speed of the boat override the very moderate spring force applied to the jaws by spring wire 72. Accordingly, the jaws open (i.e., the tips 90 separate). The front portion of the U-bolt 25 enters entrance 89 and the two jaws, now that the opening force is removed, spring back together so as to close entrance 89. The tips 90 extend toward each other and through the opening in the U-bolt. While the two tips may be slightly separated from each other, the clearance between the two tips is not sufficient for the U-bolt to pass therethrough. The shock absorber pad 86 provides a cushioning bumper for the leading edge of the U-bolt. Pad 86 is located by means of bolt 93 and when contacted by the U-bolt becomes trapped between side plates 29 and 30, support plate 61, and the bow of the boat.

Once the U-bolt is latched onto by latching jaws 73, it cannot pull loose. Any force exerted by the U-bolt in a reverse direction pushes back against tips 90. This in turn causes the jaws to try and pivot. One latching jaw tries to pivot in a counterclockwise direction while the other latching jaw tries to pivot in a clockwise direction. As should be understood, this pivoting motion of the two latching jaws brings ends 75 toward each other and toward abutment block 76. Consequently, as the U-bolt pushes against tips 90, this causes jaw ends 75 to push hard against abutment block 76. Since ends 75 are initially set so as to be in virtual contact with block 76 and under spring pressure, there is effectively no pivoting movement allowed to either jaw. Consequently, jaw tips 90 do not move apart from one another and the U-bolt 25 is unable to pull free from its latched condition. The greater the force the U-bolt exerts on tips 90, the greater the pressure by ends 75 on block 76. However, the U-bolt 25 still will not be able to come unlatched as the separation between tips 90 is not sufficient for the U-bolt to pass therethrough. The boat may now be removed from the water without the operator leaving his seat. After leaving the loading ramp area, a bow line can be attached and tightened with a winch to prevent the boat from bouncing during transit.

When it is time to release the U-bolt in order to remove the boat from the trailer, the release member 82 is manually pushed in the direction of block 76 (see FIGS. 6 and 7). The pointed tips 100 and 101 which are wedged into the junction between jaw ends 75 and block 76 push against this junction, causing the jaws to pivot apart from each other. The pivoting action of the jaws overcomes the spring biasing force of spring wires 72 and the continued manually pushing on release member 82 causes the jaws to spread farther and farther apart until the tips 90 are effectively flush with the edges of the slot in support plate 61 (see FIG. 7). The tapering and diverging edges of release member 82 from tips 100 and 101 to securing tips 102 and 103 enables the separation of the jaws to be a relatively easy task. When tips 102 and 103 are reached by ends 75, the slight lip on each end 75 locks onto tips 102 and 103, holding the jaws in an open condition. The open front channel 104 in member 82 abuts up against block 76 in this position and the guide screw is positioned at the end of the center slot in member 82.

By placing the latching mechanism 23 in this held-open condition, the boat can be removed from the trailer without the need for someone to stand by the latching mechanism and hold it in an open condition. Once the U-bolt is freed from the latching mechanism, the lip 107 on the release member 82 is simply pulled back in order to release the two latching jaws 73 and allow them to return to the unlatched condition, ready to once again receive U-bolt 25.

Figure 10:
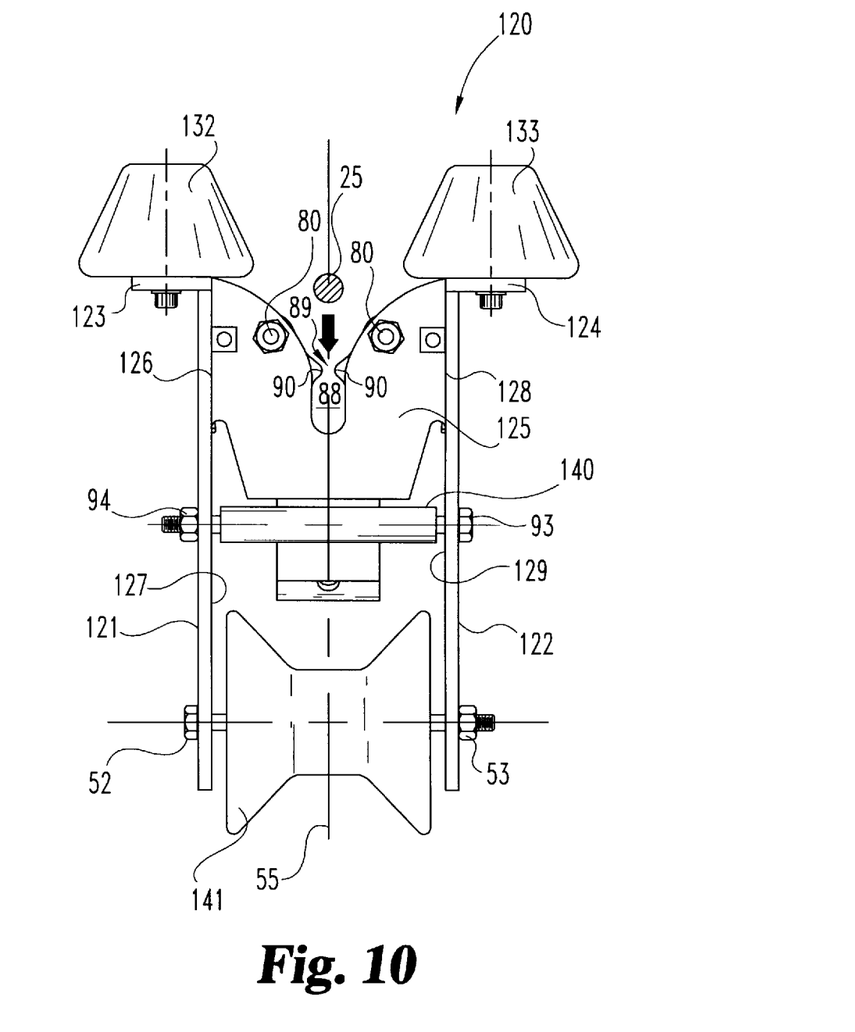
FIG. 10 is a top plan view of a latching mechanism according to another embodiment of the present invention in an unlatched condition.
Figure 11:
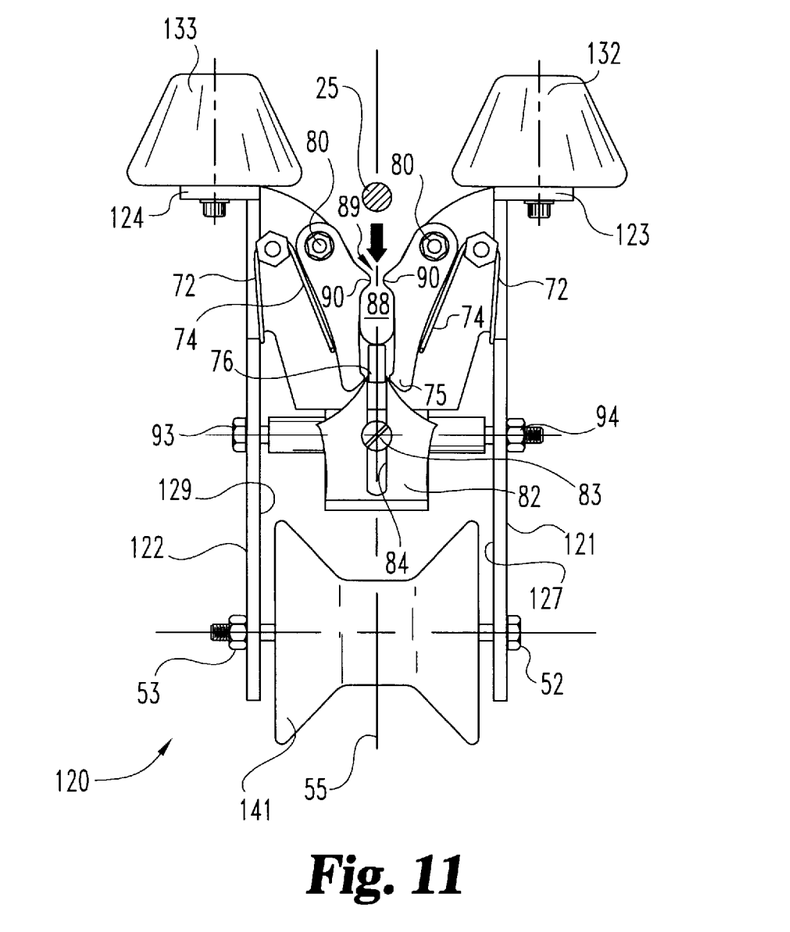
FIG. 11 is a bottom plan view of the FIG. 10 latching mechanism.
Figure 12:
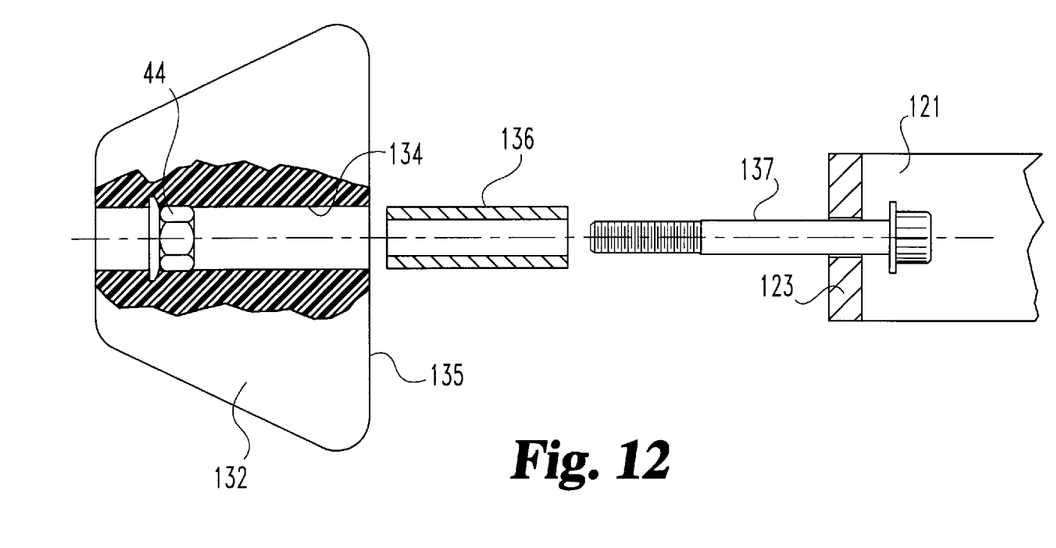
FIG. 12 is a fragmentary, side elevational, exploded view of an alignment cone and cooperating hardware comprising a portion of the FIG. 10 latching mechanism.

With reference to FIGS. 10–12, an alternative embodiment of the present invention is illustrated. The differences between latching mechanism 120 and latching mechanism 23 (see FIGS. 2 and 3) are directed primarily to the design of the alignment cone subassemblies 33 (see FIGS. 2, 3, 8, and 9), the construction scheme for the unitary metal frame, and making the shock absorber pad 86 less critical.

In FIGS. 10 and 11, mechanism 120 is illustrated in an unlatched condition similar to the orientation of mechanism 23 in FIGS. 2 and 3. The points of similarity, as well as the differences, between mechanisms 23 and 120 will be generally apparent from a careful and thorough drawing comparison.

Mechanism 120 includes side plates 121 and 122 which are substantially flat and substantially parallel to each other. A substantially flat cone support flange 123 is welded to plate 121 and a similar support flange 124 is welded to plate 122. As an alternative, each flange may be in unitary construction with its corresponding plate and merely bent in order to establish the right angle relationship between the flange and the corresponding side plate. Support plate 125 is a substantially flat member which is welded along one side edge 126 to the inside surface 127 of side plate 121 and along the other, opposite side edge 128 to the inside surface 129 of side plate 122. Support plate 125 is set at a slight incline relative to the two side plates 121 and 122. In the orientation of FIG. 10, the direction of incline of support plate 125 is in what would be characterized as a downward direction, extending from the vicinity of the pair of alignment cones 132 and 133 in the direction of the rear guide roller. This incline positions support plate 125 beneath sleeve 140 as is illustrated in FIG. 10.

The cooperating pair of alignment cones 132 and 133 are bolted to support flanges 123 and 124, respectively. Each alignment cone is a hard rubber member with a center bore 134 (see FIG. 12) which receives at one end and securely captures therein a flanged hexnut 44 (or 45). Extending between hexnut 44 and the larger end 135 of cone 132 is a steel spacer 136. Allen-head bolt 137 extends through an opening in flange 123 and mates with hexnut 44 in order to pull cone 132 tightly against flange 123. A similar assembly technique and arrangement is provided with regard to cone 133 and flange 124.

The arrangement of components on support plate 125 is virtually identical to the arrangement of components on support plate 61, including the side arms, spring posts, spring wires, the shoulder bolts, and the cooperating latching jaws. Likewise, the shapes, edges, and relationships found on support plate 61 are virtually identical to those found on support plate 125, including the shape of the jaws, the central clearance slot, the centerline of the central clearance slot, and the diverging sides. The abutment block 76 and the release member of mechanism 23 are virtually identical to the corresponding components of mechanism 120. The intention is for the entirety of support plate 125 and all of its assembled and cooperating components to be designed and to function in a manner which is virtually identical to the corresponding portions, components, and features of mechanism 23 and support plate 61.

One difference, as previously noted, is that shock absorber pad 86 of mechanism 23 is omitted in mechanism 120. Instead, the bolt 93 and nut 94 arrangement which is still used to attach the latching mechanism to the clevis-type bracket arrangement 26, includes a hard rubber sleeve 140 which helps set the clearance spacing for support flanges 95 and 96. In the event the bow of the boat would contact sleeve 140, its hard rubber material will not scratch or deface the bow of the boat.

Guide roller 141 of mechanism 120 is virtually identical to guide roller 49 in mechanism 23, including its mounting method and hardware as well as the adjustability as to the selected mounting location through side plates 121 and 122.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A latching mechanism constructed and arranged to be attached to a boat trailer and to securely receive a boat bow connection member so as to keep the boat on the boat trailer, said latching mechanism comprising:

a frame member including a pair of oppositely-disposed side plates and a support plate positioned between and attached to the pair of oppositely-disposed side plates, said support plate defining a receiving channel which includes a closed base and opposite thereto an open end;

a pair of latching jaws which are pivotally attached to said support plate, one latching jaw of said pair being positioned on one side of said receiving channel and the other latching jaw of said pair being positioned on an opposite of said receiving channel, each of said latching jaws including a tip portion which extends inwardly toward the receiving channel;

a pair of spring-biased arrangements attached to said support plate, one each of said arrangements being positioned to cooperate with a corresponding one of said latching jaws so as to normally position said latching jaws in a closed and latching condition, when in said closed and latching condition the tip portions of said latching jaws being adjacent to each other so as to reduce the width of the open end of said receiving channel, said adjacent tip portions having an entrance side and and opposite thereto an exit side;

a release mechanism attached to said support plate and being moveable to pivotally separate said latching jaws so as to place said latching jaws in an open condition; and wherein said latching jaws being pivotally moveable to said open condition by pushing said connection member against said entrance side of the tip portions, said tip portions returning to said closed condition once said connection member is positioned adjacent the base of said receiving channel.

2. The latching mechanism of claim 1 which further includes a pair of oppositely-disposed alignment cones, one each being attached to a corresponding one of the pair of oppositely-disposed side plates.

3. The latching mechanism of claim 2 which further includes a bow support roller positioned between said pair of oppositely-disposed side plates.

4. The latching mechanism of claim 3 which further includes a shock-absorbing bumper positioned adjacent said closed base and between said pair of oppositely-disposed side plates.

5. The latching mechanism of claim 1 which further includes a shock-absorbing bumper positioned adjacent said closed base and between said pair of oppositely-disposed side plates.

6. A latching mechanism constructed and arranged to be attached to a boat trailer and to securely receive a boat bow connection member so as to facilitate keeping the boat on the boat trailer, said latching mechanism comprising:

a frame member including a pair of oppositely-disposed side portions and a support portion positioned between and attached to the pair of oppositely-disposed side portions, said support portion defining a receiving channel;

a pair of latching members which are pivotally attached to said support portion, one latching member of said pair being positioned on one side of said receiving channel and the other latching member of said pair being positioned on an opposite side of said receiving channel, each of said latching members including a tip portion which extends inwardly toward said receiving channel;

a pair of spring-biased arrangements attached to said support portion, one each of said spring-biased arrangements being positioned to cooperate with a corresponding one of said latching members so as to normally position said latching members in a latching condition, when in said latching condition the tip portions of said latching members being adjacent to each other so as to reduce the width of said receiving channel, said adjacent tip portions having an entrance side and opposite thereto an exit side;

a release mechanism attached to said support portion and being moveable to pivotally separate said latching members so as to place said latching members in an open condition; and wherein said latching members being pivotally moveable to said open condition by pushing said connection member against said entrance side of the tip portions, said tip portions returning to said latching condition due to said spring-biased arrangements once said connection member is positioned in said receiving channel.

7. The latching mechanism of claim 6 which further includes a pair of oppositely-disposed alignment cones, one each being attached to a corresponding one of the pair of oppositely-disposed side portions.

8. The latching mechanism of claim 7 which further includes a bow support roller positioned between said pair of oppositely-disposed side portions.

9. The latching mechanism of claim 8 which further includes a shock-absorbing bumper positioned adjacent a closed base of said receiving channel and between said pair of oppositely-disposed side portions.

10. The latching mechanism of claim 6 which further includes a shock-absorbing bumper positioned adjacent a closed base of said receiving channel and between said pair of oppositely-disposed side portions.

11. A latching mechanism constructed and arranged to be attached to a boat trailer and to securely receive a boat bow connection member so as to facilitate keeping the boat on the boat trailer, said latching mechanism comprising:

a frame member defining a receiving channel for receipt of said connection member, said receiving channel including an entrance;

a pair of spring-biased latching members which are pivotally attached to said frame member, said spring-biased latching members being constructed and arranged to be normally oriented in a closed condition wherein said spring-biased latching members cooperate to narrow the width of said receiving channel at a location adjacent said entrance;

a release mechanism attached to said frame member and being moveable to pivotally separate said latching members so as to place said latching members in an open condition; and wherein said spring-biased latching members are pivotally moveable to said open condition by the action of pushing said connection member into abutment against said spring-biased latching members until said connection member enters said receiving channel.

12. The latching mechanism of claim 11 which further includes a pair of oppositely-disposed alignment cones, each of which is attached to said frame member.

13. The latching mechanism of claim 12 which further includes a bow support roller attached to said frame member.

* * * * *